United States Patent [19]

Geiger et al.

[11] Patent Number: 4,827,471

[45] Date of Patent: May 2, 1989

[54] METHOD FOR BUS ACCESS FOR DATA TRANSMISSION THROUGH A MULTIPROCESSOR BUS

[75] Inventors: Gerhard Geiger, Schliersee; Michael Strafner, Müchen, both of Fed. Rep. of Germany

[73] Assignee: Siemens Aktiengesellschaft, Berlin and Munich, Fed. Rep. of Germany

[21] Appl. No.: 97,364

[22] Filed: Sep. 11, 1987

Related U.S. Application Data

[63] Continuation of Ser. No. 768,502, Aug. 22, 1985, abandoned.

[30] Foreign Application Priority Data

Aug. 23, 1984 [DE] Fed. Rep. of Germany ....... 3431043

[51] Int. Cl.$^4$ .............................................. H04J 3/02
[52] U.S. Cl. .................... 370/85; 340/825.5
[58] Field of Search ............. 370/85, 100, 17, 67, 370/110.1, 113, 93, 95; 340/825.5, 825.04

[56] References Cited

U.S. PATENT DOCUMENTS 4,295,122 10/1981 Hatada et al. .................... 340/825.5
4,385,382 5/1983 Goss et al. ....................... 340/825.5
4,516,240 5/1985 Kume et al. ..................... 340/825.5

FOREIGN PATENT DOCUMENTS 0035731 9/1981 European Pat. Off. .
0051794 5/1982 European Pat. Off. .
0080369 6/1983 European Pat. Off. .

OTHER PUBLICATIONS

Electronics International, vol. 57, No. 6, Mar. 1984, pp. 132–138.
Electronic Components and Applications, vol. 5, No. 4, Sep. 1983, pp. 214–221.
IEEE 1981 National Aerospace and Electronics Conference, vol. 1, 1981, pp. 309–317.
Implementing Functions, Euromicro 1981, pp. 35–41.

Primary Examiner—Robert L. Griffin
Assistant Examiner—Curtis Kuntz
Attorney, Agent, or Firm—Herbert L. Lerner; Laurence A. Greenberg

[57] ABSTRACT

A method for the bidirectional data exchange between integrated building blocks through a multiprocessor bus in time multiplex operation determined by a pulse frame synchronizing signal fed to the building blocks includes:
(a) fixing a monitor channel for bus access control information and fixing a data channel within the pulse frame;
(b) checking the monitor channel with a building block desiring bus access for possibly available control information;
(c) setting control information of the building block if the multi-processor bus is free; and
(d) transmitting the data in the data channel.

6 Claims, 3 Drawing Sheets

METHOD FOR BUS ACCESS FOR DATA TRANSMISSION THROUGH A MULTIPROCESSOR BUS

This application is a continuation of application Ser. No. 768,502, filed Aug. 22, 1985, now abandoned.

The invention relates to a method for the bidirectional data exchange between integrated building (i.e. "function") blocks through a multiprocessor bus in time multiplex operation determined by a pulse frame synchronizing signal.

Bus structures are the connecting lines between function blocks or circuit packages and modules of a micro or mini-computer system which may include several processors, memories and peripheral units. The construction of a bus system and the corresponding method of operation thereof depend on the function blocks used and the application of the system. An essential feature for distinguishing bus systems is the manner in which the access of the individual connected components is determined. In the bus assignment according to the master principle, each connected function block is capable of initiating a data transfer to an addressed function block or slave. If several function blocks are seeking access simultaneously, the bus assignment must be determined by priority control. Other known methods include controlling the bus assignment centrally or fixing a hard-wired priority chain.

A further feature is the architecture of data address and control buses which be operated in parallel or in series.

Finally, the format of the transmitted data must be determined for each bush system. In block-wise transmission, a start bit is followed by the source and sink address and the information proper. These blocks can be fixed in time-multiplex operation, for instance, by a so-called PCM pulse frame which is derived from a synchronization signal.

If a multiprocessor bus is operated in parallel by the time multiplex method, access problems occur is several processors wish to transmit data simultaneously. Then, either an additional arbiter serving as a superimposed control is required and/or additional control lines and priority lines must be provided. An example of such a bus structure with several partial systems is described in the publication "Elektronik" 1982, No. 10, Pages 90 to 96.

A further possibility of avoiding collisions can be carried out by spontaneously starting each processor with the data transmission while it continuously checks whether the transmitted data are actually present on the bus, i.e., are transmitted, or another processor has prevailed. In this case, it terminates the transmission in favor of the other transmitter. It is a disadvantage of such a device that the danger of losing data cannot by precluded, or that measures are required for each processor, through which the loss of data is prevented if the transmission is terminated.

It is accordingly an object of the invention to provide a method of data transmission through a multiprocessor bus, which overcomes the hereinafore-mentioned disadvantages of the heretofore-known methods of this general type which is simple and reliable.

With the foregoing and other objects in view there is provided, in accordance with the invention, a method for the bidirectional data exchange between integrated function blocks through a multiprocessor bus in time multiplex operation determined by a pulse frame synchronizing signal fed to the function blocks, which comprises:

(a) fixing a monitor channel for bus access control information and fixing a data channel within the pulse frame;
(b) checking the monitor channel with a function block desiring bus access for possibly available control information;
(c) setting control information of the function block if the multi-processor bus is free; and
(d) transmitting the data in the data channel.

In accordance with another mode of the invention, there is provided a method which comprises forming the control information of an occupation code element and priority information including a plurality of bits.

In accordance with an added mode of the invention, there is provided method which comprises carrying out the step of checking the control information bit-by-bit, immediately terminating the checking step in the event of a negative result, and repeating the checking step in one of the following pulse frames.

In accordance with an additional mode of the invention, there is provided a method which comprises carrying out a revolving priority within the individual function blocks.

In accordance with a concomitant mode of the invention, there is provided a method which comprises connecting the function blocks to the multi-processor bus through open drain and open collector stages.

The invention makes use of the frame synchronizing signals which are available in time-multiplex operation. Within a frame, the information located in a firmly predetermined time slot serves for the control of the bus. Preferably, the bit following the effective edge or side of the synchronizing signal is used for requesting a bus. The priority can be fixed by further bits. The method is simply carried out with high security of the data to be transmitted.

Other features which are considered as characteristic for the invention are set forth in the appended claims.

Although the invention is illustrated and described herein as embodied in a method of data transmission through a multiprocessor bus, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
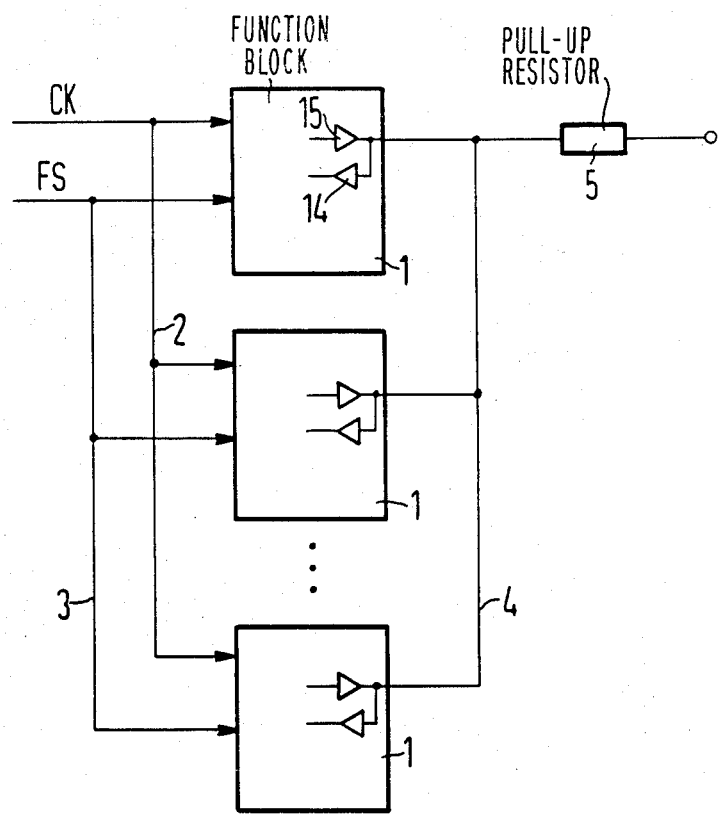
FIG. 1 is a schematic and block circuit diagram of the bus structure of the invention.

Referring now to the figures of the drawings in detail and first, particularly, to FIG. 1 thereof, there is seen a device formed of several integrated function blocks which exchange data through a serial data bus 4 (multiplexer bus). All of the function blocks 1 are acted upon by a clock frequency CK through a clock line 2 and are operated synchronously. The data transmission on the data bus 4 is bidirectional according to the time multiplex method, wherein the pulse frames are fixed as in a PCM system by a frame synchronizing signal FS on a synchronizing line 3. Each building block 1 can be operated as a transmitter as well as a receiver. The building block 1 which prevails on the data bus 4 is called the master. The building block or building blocks addressed by the data bus are called slaves. The building blocks 1 transmit and receive through so-called "open drain" or "open collector" output stages 15, 14, respectively. As a result, the logical L-signal prevails. The data bus 4 is acted upon by a positive operating voltage through a so-called pull-up resistor 5.

Figure 2:
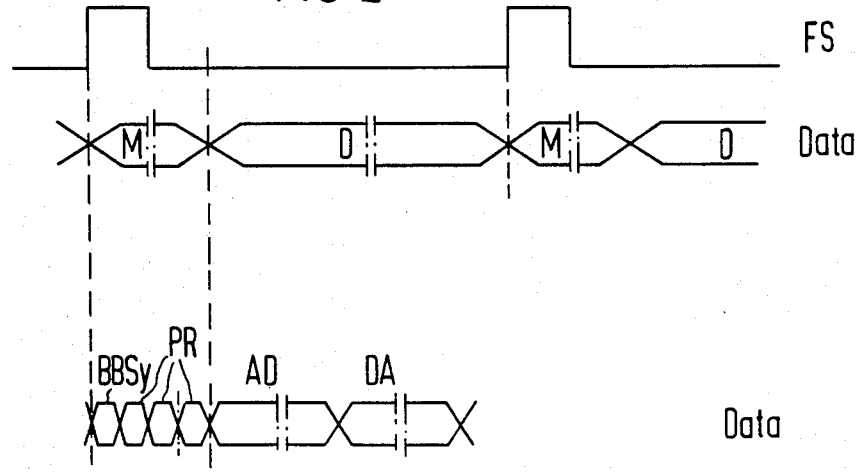
FIG. 2 is a diagram showing the waveform of the signals belonging to the structures shown in FIGS. 1 and 3.

The timing diagram of FIG. 2 shows the frame synchronizing signal FS and below it, the diagram shows the principle of the signal waveform on the data bus 4 within the pulse frame defined by the positive edges or sides of the synchronizing signal FS and how a first timing channel M (monitoring channel) with control information and a second timing channel D (data channel) are formed. As is further shown in FIG. 2, the monitoring channel M contains an occupation code element which is formed of a bit BBSy and through which the desire of a function block 1 for a bus access or an actual bus access is signaled. The monitoring channel M contains several bits PR determining the priority The data DA to be transmitted and corresponding address AD are contained in the data channel D in a conventional manner.

The course of the bus access is described below. If a function block 1 wants access to the data bus 4, it checks the monitoring channel M and sets the occupation code element BBSy and priority information PR. of its own if the data bus 4 is free. Upon request (signal BRQ) by a non-illustrated unit such as a telephone terminal through an input amplifier 14 each function block 1 connected to the data bus 4 checks the BBSy bit in the monitoring channel M. If this bit is not activated (L-level), it can be set by the function block 1. In order to prevent a collision if several function blocks 1 seek access in the same pulse frame, each function block 1 additionally sets priority information characterizing itself, which are priority bits $PR_i$. At the same time, each function block 1 checks which priority bits are present on the data bus. Only the function block having the priority bits which have prevailed on the data bus obtains access to the bus. This prevailing master keeps the BBSy bit set for a fixed number of pulse frames. In order to prevent function blocks with a logical zero of the priority bits from blocking other function blocks with a logical-1 majority for an extended period of time, each master must wait several frames after a successful bus access before it is admitted for a further bus access, due to a revolving internally set priority.

Figure 3:
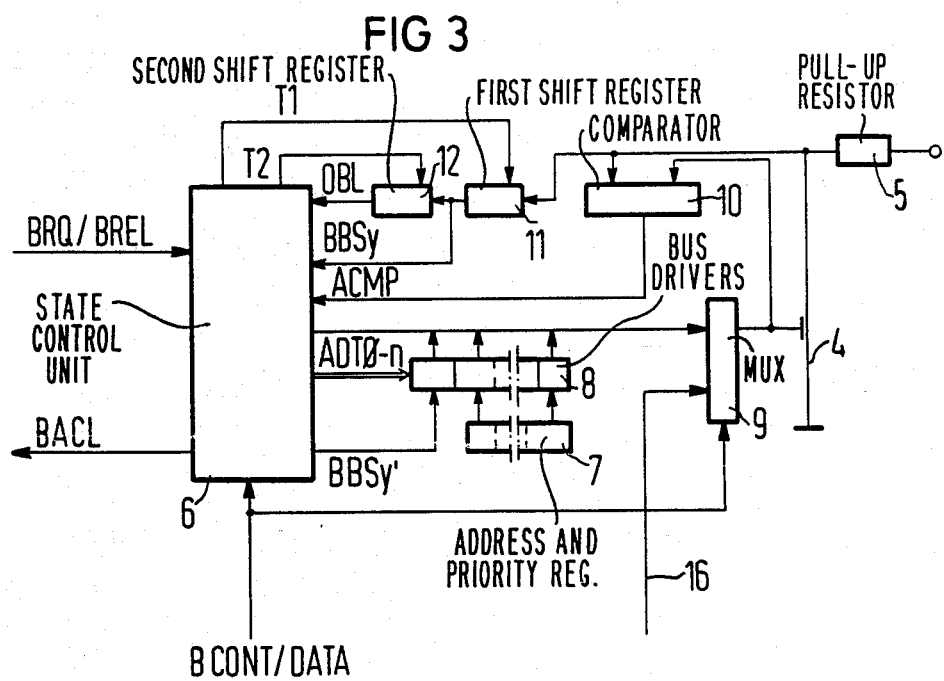
FIG. 3 is a circuit block diagram of a block circuit according to FIG. 1.
Figure 4:
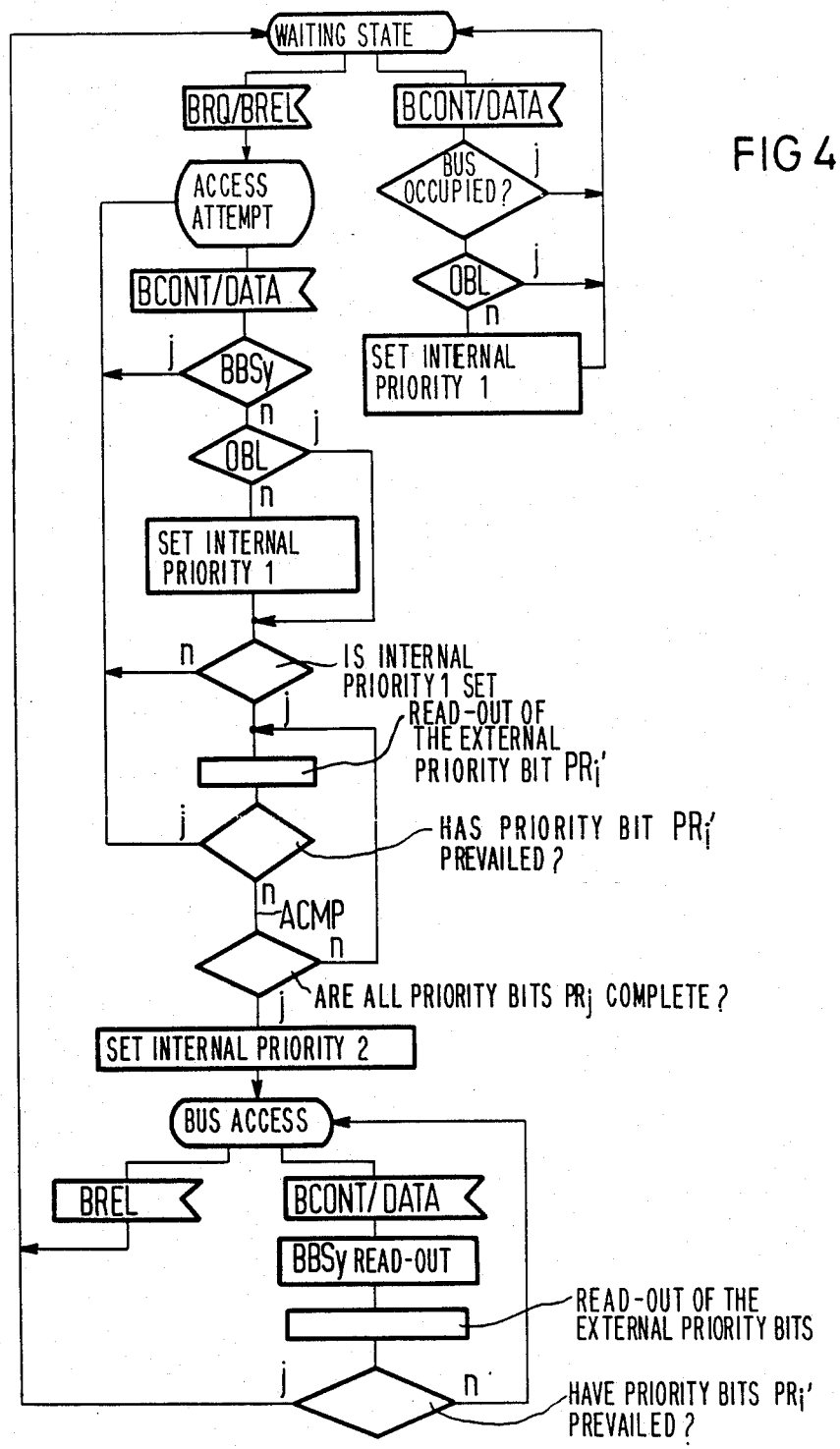
FIG. 4 is a flow chart giving details of the operation of the device according to FIGS. 1 and 2.

An example of the method can be seen in detail from FIG. 3 in conjunction with FIG. 4. Each function block 1 contains a state control unit 6 which can be constructed, for instance, from flip-flops. Furthermore, each unit includes an address register 7, bus drivers 8 connected thereto, a multiplexer 9 for separating the monitoring channel M from the data channel D, a comparator 10 and two series-connected shift registers 11, 12. The state control unit 6 serves for storing three states, which are a waiting state, a state in which access to the bus 4 is attempted, and a state in which the respective building block 1 has access to the bus 4.

Starting from the waiting state, the function block 1 signals the request for a bus access by a signal BRQ Thereupon, the waiting state is abandoned and the state "attempted access" is occupied. As soon as the instant of a bus assignment is reported with a signal BCONT determined by the non-illustrated bus control unit (different from a data output to be carried out in the case of the signal DATA), the state of the bus 4 is checked for the presence of the BBSy bit. If it is indicated in the process that the bus is already occupied by another function block, this checking is repeated in the next time slot On the other hand, if the bus is free, it is checked by a signal OBL as to whether or not the bus 4 was reported as instant. This revolving priority can be checked by writing the BBSy bit into the first shift register 11 in the case of a bus access by the data bus 4 at a first shift clock pulse T1 during the actual access cycle. From there it is written into the shift register 12 under a second shift clock pulse T2 in the following access cycle The contents of the two shift registers 11, 12 (OBL bit and BBSy bit, respectively) internally determine a first higher-significance priority 1 or a less significant second priority 2, which prevents a longer blocking due to the external priority bit PR, as mentioned above. The presence of the OBL bit in the second shift register 12 indicates that the corresponding function block is already subjected to an assignment cycle and that the possibility of a bus access already exists for another unit. If this is not the case, the actual access attempt is stored by setting the BBSy bit in the first shift register 11, and in this manner, a further access attempt at the following bus assignment instant is prevented.

As long as the function block 1 attempting the access does not have the first internal priority 1, the attempts just described above are repeated in the following pulse frame. In the other case, priority bits $PR_i'$ permanently assigned to the respective unit 1 and stored in a register 7 are read out individually on the bus 4 by control signals ADT∅-n.

Subsequently, a bit-by-bit comparison is made between the priority bits $PR_i$ present in the monitoring channel on the data bus 4 and the priority bits $PR_i$ stored in the register 7. In the case of agreement, a respective comparison signal ACMP is generated. If no agreement is ascertained, the access attempt is terminated immediately. However, if all priority bits $PR_i$ (i=0 to n) are read out successfully on the data bus 4, the state "bus access" is assumed within the same pulse frame and is indicated by a signal BACL and the internal priority of the respective function block 1 is reduced (internal priority 2).

During the bus access, a control signal DATA generated by the time control unit switches the multiplexer 9 from the monitoring channel M to the data channel 4 and data are given to the data bus 4 over a line 16.

In order to maintain the bus access, a signal BBSy' is given out by the state control unit 6 of the respective function block 1, through the driver 8 and the multiplexer 9 to the data bus 4, at the beginning of each monitoring channel M. This state can exist until the non-illustrated unit already mentioned above sends a signal BREL which causes the return to the waiting state and the release of the bus.

The foregoing is a description corresponding in substance to German Application No. P 34 31 043.6, dated Aug. 23, 1984, the International priority of which is being claimed for the instant application, and which is hereby made part of this application. Any material discrepancies between the foregoing specification and the aforementioned corresponding German application are to be resolved in favor of the latter.

We claim:

1. Method for accessing a multiprocessor data bus by one of a plurality of integrated function blocks seeking access to the bus for exchanging data via the bus with another function block, the bus which is operated in time-multiplex by means of a pulse frame synchronizing signal, which includes fixedly positioned within the pulse frame a first timing channel carrying bus access control information including a priority condition and a second timing channel carrying data and address information, which comprises:

checking in a first checking step, by the function block seeking access to the bus, the bus for presence of control information in the first timing channel;

checking in a second checking step, in case the bus has no control information in the first timing channel, the function block for presence of a first priority condition;

placing next, on the bus by the function block seeking access, control information specific to that function block;

checking in a third checking step, by comparison of information in the first timing channel with information present in the access-seeking function block that the specific control information is accepted by the bus; and accessing the data bus, and exchanging, by the function block having gained access, via the second timing channel the data with address information.

2. Method according to claim 1, which comprises generating the control information from an occupation code element and said priority information including a plurality of bits.

3. Method according to claim 2, which comprises carrying out the third checking step by checking by comparison of the control information in the first timing channel with information present in the access-seeking function block bit-by-bit, immediately terminating the third checking step in the event of a negative result, and repeating the checking step in one of the following pulse frames.

4. Method according to claim 1, which comprises carrying out a revolving priority within the individual function blocks.

5. Method according to claim 1, which comprises connecting the function blocks to the multi-processor bus through at least one of an open drain and open collector stages.

6. Method according to claim 1, wherein the function blocks are of equal rank.

* * * * *